(12) United States Patent
Lim

(10) Patent No.: US 8,982,089 B2
(45) Date of Patent: Mar. 17, 2015

(54) TOUCH PANEL AND ELECTRONIC DEVICE INCLUDING THE SAME

(75) Inventor: Seong-Taek Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 283 days.

(21) Appl. No.: 12/948,479

(22) Filed: Nov. 17, 2010

(65) Prior Publication Data

US 2011/0227862 A1  Sep. 22, 2011

(30) Foreign Application Priority Data

Mar. 22, 2010 (KR) .................. 10-2010-0025354

(51) Int. Cl.
  *G09G 5/00* (2006.01)
  *G06F 3/044* (2006.01)

(52) U.S. Cl.
  CPC ..................... *G06F 3/044* (2013.01)
  USPC .............. 345/174; 345/173; 345/55

(58) Field of Classification Search
  USPC ................................ 345/174, 173
  See application file for complete search history.

(56) References Cited

U.S. PATENT DOCUMENTS

| 4,923,057 | A | 5/1990 | Carlson et al. |
| 4,963,417 | A | 10/1990 | Taniguchi et al. |
| 5,055,840 | A | 10/1991 | Bartlett |
| 5,222,895 | A | 6/1993 | Fricke |
| 5,856,822 | A | 1/1999 | Du et al. |
| 5,977,867 | A | 11/1999 | Blouin |
| 6,118,435 | A | 9/2000 | Fujita et al. |
| 6,278,439 | B1 | 8/2001 | Rosenberg et al. |
| 6,317,116 | B1 | 11/2001 | Rosenberg et al. |
| 6,429,846 | B2 | 8/2002 | Rosenberg et al. |
| 6,809,462 | B2 | 10/2004 | Pelrine et al. |
| 7,051,292 | B2 | 5/2006 | Nagase |
| 7,067,756 | B2 | 6/2006 | Cok |
| 7,131,073 | B2 | 10/2006 | Rosenberg et al. |
| 7,196,688 | B2 | 3/2007 | Schena |
| 7,202,837 | B2 | 4/2007 | Ihara |

(Continued)

FOREIGN PATENT DOCUMENTS

| CN | 1678978 A | 10/2005 |
| CN | 1829951 A | 9/2006 |

(Continued)

OTHER PUBLICATIONS

Extended European search report dated Oct. 7, 2010 issued by the European Patent Office in counterpart European Application No. 10166013.2 of co-pending U.S. Appl. No. 12/780,996.

(Continued)

*Primary Examiner* — William Boddie
*Assistant Examiner* — Leonid Shapiro
(74) *Attorney, Agent, or Firm* — Sughrue Mion, PLLC

(57) ABSTRACT

A touch panel and an electronic device including the same are provided. The touch panel includes a touch panel body including a first substrate and a second substrate that is spaced apart from the first substrate, driving electrodes that are arranged on the first substrate and the second substrate, and electro-rheological fluid that fills a gap between the first substrate and the second substrate; a driver that applies a driving voltage to all or a portion of the driving electrodes; and a sensor that applies a sensing signal sequentially to the driving electrodes and senses a variation in capacitance between the driving electrodes due to a variation of the gap between the first substrate and the second substrate in response to the sensing signal.

20 Claims, 12 Drawing Sheets

(56) References Cited

U.S. PATENT DOCUMENTS

| | | |
|---|---|---|
| 7,268,770 B1 | 9/2007 | Takahata et al. |
| 7,339,572 B2 | 3/2008 | Schena |
| 7,342,573 B2 | 3/2008 | Ryynaenen et al. |
| 7,436,396 B2 | 10/2008 | Akieda et al. |
| 7,477,242 B2 | 1/2009 | Cross et al. |
| 7,511,706 B2 | 3/2009 | Schena |
| 7,589,714 B2 | 9/2009 | Funaki |
| 7,598,949 B2 | 10/2009 | Han |
| 7,608,976 B1 | 10/2009 | Cheng et al. |
| 7,679,611 B2 | 3/2010 | Schena |
| 7,688,080 B2 | 3/2010 | Golovchenko et al. |
| 7,719,167 B2 | 5/2010 | Kwon et al. |
| 8,164,573 B2 | 4/2012 | DaCosta et al. |
| 8,345,013 B2 | 1/2013 | Heubel et al. |
| 8,493,131 B2 | 7/2013 | Mo et al. |
| 8,581,866 B2 | 11/2013 | Park et al. |
| 2001/0026636 A1 | 10/2001 | Mainguet |
| 2001/0035854 A1 | 11/2001 | Rosenberg et al. |
| 2002/0033795 A1 | 3/2002 | Shahoian et al. |
| 2002/0039620 A1 | 4/2002 | Shahinpoor et al. |
| 2002/0101410 A1 | 8/2002 | Sakata et al. |
| 2003/0016849 A1 | 1/2003 | Andrade |
| 2004/0090426 A1 | 5/2004 | Bourdelais et al. |
| 2005/0057528 A1 | 3/2005 | Kleen |
| 2005/0076824 A1 | 4/2005 | Cross et al. |
| 2005/0130604 A1 | 6/2005 | Chipchase et al. |
| 2005/0200286 A1 | 9/2005 | Stoschek et al. |
| 2005/0285846 A1 | 12/2005 | Funaki |
| 2006/0097991 A1 | 5/2006 | Hotelling et al. |
| 2006/0099808 A1* | 5/2006 | Kondo ................. 438/674 |
| 2006/0103634 A1 | 5/2006 | Kim et al. |
| 2006/0119589 A1 | 6/2006 | Rosenberg et al. |
| 2007/0080951 A1 | 4/2007 | Maruyama et al. |
| 2007/0152974 A1 | 7/2007 | Kim et al. |
| 2007/0152982 A1 | 7/2007 | Kim et al. |
| 2007/0182718 A1 | 8/2007 | Schoener |
| 2007/0211032 A1 | 9/2007 | Ahn et al. |
| 2007/0229464 A1 | 10/2007 | Hotelling et al. |
| 2008/0007815 A1 | 1/2008 | Liang et al. |
| 2008/0024459 A1 | 1/2008 | Poupyrev et al. |
| 2008/0024461 A1 | 1/2008 | Richter et al. |
| 2008/0036746 A1 | 2/2008 | Klinghult |
| 2008/0100590 A1 | 5/2008 | Hur et al. |
| 2008/0111788 A1 | 5/2008 | Rosenberg et al. |
| 2008/0143689 A1* | 6/2008 | Foo et al. ................. 345/174 |
| 2008/0158169 A1 | 7/2008 | O'Connor et al. |
| 2008/0165134 A1 | 7/2008 | Krah |
| 2008/0165158 A1 | 7/2008 | Hotelling et al. |
| 2008/0284277 A1 | 11/2008 | Kwon et al. |
| 2009/0002199 A1 | 1/2009 | Lainonen et al. |
| 2009/0002328 A1 | 1/2009 | Ullrich |
| 2009/0046065 A1 | 2/2009 | Liu et al. |
| 2009/0046068 A1 | 2/2009 | Griffin |
| 2009/0075694 A1 | 3/2009 | Kim et al. |
| 2009/0085878 A1 | 4/2009 | Heubel et al. |
| 2009/0182501 A1 | 7/2009 | Fyke et al. |
| 2009/0231305 A1 | 9/2009 | Hotelling et al. |
| 2009/0308737 A1 | 12/2009 | Kudoh |
| 2010/0024573 A1 | 2/2010 | Daverman et al. |
| 2010/0026654 A1 | 2/2010 | Suddreth |
| 2010/0026655 A1 | 2/2010 | Harley |
| 2010/0059295 A1 | 3/2010 | Hotelling et al. |
| 2010/0060610 A1 | 3/2010 | Wu |
| 2010/0149108 A1* | 6/2010 | Hotelling et al. .......... 345/173 |
| 2010/0156829 A1 | 6/2010 | Shimodaira |
| 2010/0177050 A1 | 7/2010 | Heubel et al. |
| 2010/0214232 A1 | 8/2010 | Chan et al. |
| 2010/0244858 A1 | 9/2010 | Cormier, Jr. |
| 2010/0259485 A1 | 10/2010 | Chuang |
| 2010/0321330 A1 | 12/2010 | Lim et al. |
| 2010/0321335 A1 | 12/2010 | Lim et al. |
| 2011/0057899 A1* | 3/2011 | Sleeman et al. .......... 345/174 |
| 2011/0163978 A1 | 7/2011 | Park et al. |
| 2011/0181530 A1 | 7/2011 | Park et al. |
| 2011/0227862 A1 | 9/2011 | Lim |
| 2011/0279374 A1 | 11/2011 | Park et al. |
| 2012/0019467 A1* | 1/2012 | Hotelling et al. .......... 345/173 |
| 2012/0038563 A1 | 2/2012 | Park et al. |
| 2012/0086651 A1 | 4/2012 | Kwon et al. |
| 2012/0127122 A1 | 5/2012 | Lim |
| 2012/0262410 A1 | 10/2012 | Lim |

FOREIGN PATENT DOCUMENTS

| | | |
|---|---|---|
| CN | 101046720 A | 10/2007 |
| CN | 101510008 A | 8/2009 |
| CN | 101840296 A | 9/2010 |
| EP | 1 544 720 A1 | 6/2005 |
| EP | 2 026 178 A1 | 2/2009 |
| EP | 2 141 569 A2 | 1/2010 |
| EP | 2 079 052 B1 | 3/2011 |
| JP | 6-34940 A | 2/1994 |
| JP | 09-319509 A | 12/1997 |
| JP | 11-203025 A | 7/1999 |
| JP | 11-273501 A | 10/1999 |
| JP | 2000-066782 A | 3/2000 |
| JP | 2001-282433 A | 10/2001 |
| JP | 2002-157087 A | 5/2002 |
| JP | 2002-236550 A | 8/2002 |
| JP | 2002-342035 A | 11/2002 |
| JP | 2004-71765 A | 3/2004 |
| JP | 2004-362428 A | 12/2004 |
| JP | 2005-107804 A | 4/2005 |
| JP | 2005-135876 A | 5/2005 |
| JP | 2005-275632 A | 10/2005 |
| JP | 2006-011646 A | 1/2006 |
| JP | 2006-146611 A | 6/2006 |
| JP | 2007-513392 A | 5/2007 |
| JP | 2008-33739 A | 2/2008 |
| JP | 2008-257748 A | 10/2008 |
| JP | 2010-016969 A | 1/2010 |
| JP | 2010-079882 A | 4/2010 |
| JP | 2010-108505 A | 5/2010 |
| JP | 2011-3177 A | 1/2011 |
| JP | 2012-500089 A | 1/2012 |
| KR | 91-14838 A | 8/1991 |
| KR | 10-2001-0054523 A | 7/2001 |
| KR | 10-2004-0058731 A | 7/2004 |
| KR | 10-2005-0029285 A | 3/2005 |
| KR | 10-2006-0053769 A | 5/2006 |
| KR | 10-2006-0075135 A | 7/2006 |
| KR | 10-2006-0118640 A | 11/2006 |
| KR | 10-2006-0125544 A | 12/2006 |
| KR | 10-2007-0011524 A | 1/2007 |
| KR | 10-2007-0070897 A | 7/2007 |
| KR | 10-2007-0093251 A | 9/2007 |
| KR | 10-2008-0061047 A | 7/2008 |
| KR | 10-2008-0100757 A | 11/2008 |
| KR | 10-0877067 B1 | 1/2009 |
| KR | 10-2009-0011367 A | 2/2009 |
| KR | 10-2009-0029520 A | 3/2009 |
| KR | 10-0901381 B1 | 6/2009 |
| KR | 10-2009-0087351 A | 8/2009 |
| KR | 10-2009-0101292 A | 9/2009 |
| KR | 10-2009-0126760 A | 12/2009 |
| KR | 10-2010-0011368 A | 2/2010 |
| KR | 10-2010-0020065 A | 2/2010 |
| KR | 10-2010-0136759 A | 12/2010 |
| WO | 02/089038 A2 | 11/2002 |
| WO | 03/050754 A1 | 6/2003 |
| WO | 2004/014115 A1 | 2/2004 |
| WO | 2004/053909 A1 | 6/2004 |
| WO | 2004/106099 A1 | 12/2004 |
| WO | 2005/010735 A1 | 2/2005 |
| WO | 2005/091257 A1 | 9/2005 |
| WO | 2008/037275 A1 | 4/2008 |
| WO | 2009/002605 A1 | 12/2008 |
| WO | 2010105705 A1 | 9/2010 |

OTHER PUBLICATIONS

Notice of Allowance, dated Jan. 22, 2014, issued by the USPTO in related U.S. Appl. No. 12/780,996.

(56) References Cited

OTHER PUBLICATIONS

Non-Final Office Action, dated Feb. 10, 2014, issued by the USPTO in related U.S. Appl. No. 12/719,281.
Communication, dated Mar. 4, 2014, issued by the Japanese Patent Office in counterpart Japanese Patent Application No. 2010-133879.
Notice of Allowance, dated Mar. 28, 2014, issued in related U.S. Appl. No. 12/849,310.
Final US Office Action, dated Apr. 3, 2014, issued in related U.S. Appl. No. 12/889,800.
Final US Office Action, dated Mar. 7, 2014, issued in related U.S. Appl. No. 13/097,937.
Non-Final US Office Action, dated Mar. 7, 2014, issued in related U.S. Appl. No. 13/224,422.
US Advisory Action, dated Apr. 26, 2013, issued in U.S. Appl. No. 12/849,310.
Final US Office Action, dated Dec. 20, 2012, issued in U.S. Appl. No. 12/849,310.
Non-Final US Office Action, dated Aug. 28, 2012, issued in U.S. Appl. No. 12/849,310.
Non-Final US Office Action, dated Feb. 1, 2013, issued in U.S. Appl. No. 13/103,221.
Non-Final US Office Action, dated Apr. 22, 2013, issued in U.S. Appl. No. 13/050,550.
Non-Final US Election Requirement, dated Apr. 10, 2013, issued in U.S. Appl. No. 13/097,937.
European Communication, dated Mar. 19, 2013, issued in European Application No. 11150285.2.
Non-Final US Office Action, dated May 7, 2013, issued in U.S. Appl. No. 12/719,281.
Non-Final US Office Action, dated Mar. 15, 2013, issued in U.S. Appl. No. 12/889,800.
Communication dated Oct. 10, 2013 issued by the State Intellectual Property Office of P.R. China in counterpart Application No. 201010200349.1.
Final Office Action dated Nov. 22, 2013 issued by the United States Patent and Trademark Office in counterpart U.S. Appl. No. 12/849,310.
Final Office Action dated Dec. 5, 2013 issued by the United States Patent and Trademark Office in counterpart U.S. Appl. No. 13/050,550.
Non-Final Office Action dated Dec. 6, 2013 issued by the United States Patent and Trademark Office in counterpart U.S. Appl. No. 13/190,120.
Non-Final Office Action dated Jun. 20, 2013 issued by the United States Patent and Trademark Office in counterpart U.S. Appl. No. 12/780,996.
Non-Final Office Action dated Jul. 17, 2013 issued by the United States Patent and Trademark Office in counterpart U.S. Appl. No. 13/097,937.
Non-Final Office Action dated Jul. 8, 2013 issued by the United States Patent and Trademark Office in counterpart U.S. Appl. No. 12/849,310.
Non-Final Office Action dated Aug. 16, 2013 issued by the United States Patent and Trademark Office in counterpart U.S. Appl. No. 12/889,800.
Notice of Allowance dated Oct. 25, 2013 issued by the United States Patent and Trademark Office in counterpart U.S. Appl. No. 12/780,996.
Notice of Allowance dated Sep. 19, 2013 issued by the United States Patent and Trademark Office in counterpart U.S. Appl. No. 12/719,281.
Non-Final Office Action dated Aug. 12, 2013 issued by the United States Patent and Trademark Office in counterpart U.S. Appl. No. 13/224,422.
Communication issued Oct. 8, 2014, by the State Intellectual Property Office of P.R. China in related Application No. 201010609836.3.
Communication issued Oct. 16, 2014, by the European Patent Office in related Application No. 11186005.2.
Communication issued Sep. 30, 2014, by the Japanese Patent Office in related Application No. 2010-265704.
Communication issued Oct. 29, 2014, by the State Intellectual Property Office of P.R. China in related Application No. 201010280797.7.

* cited by examiner

TOUCH PANEL AND ELECTRONIC DEVICE INCLUDING THE SAME

CROSS-REFERENCE TO RELATED APPLICATION

This application claims priority from Korean Patent Application No. 10-2010-0025354, filed on Mar. 22, 2010, the entire disclosure of which is incorporated herein by reference.

BACKGROUND

1. Field

Apparatuses and methods consistent with the following description relate to a user input device, and more particularly, to a touch panel used in a user input device and an electronic device including the same.

2. Description of the Related Art

A touch panel is one example of a kind of user input device used to determine whether a user generates an input and the position of the user's input by sensing the user's contact thereon. A user may input data or signals to a touch panel by contacting or pressing a surface of the touch panel with a finger, a stylus pen or the like. The touch panel can be used as a touch pad included as a substitute for a mouse in a laptop computer, a netbook and the like, or used in place of an input switch of an electronic device. Also, the touch panel may be used in association with a display. A touch panel which is mounted on the screen of a display device, such as a liquid crystal display (LCD), a plasma display panel (PDP), cathode ray tube (CRT) and the like, is generally called a "touch screen". A touch panel may be integrated with a display device to configure the screen of the display device or may be attached additionally on the screen of the display device.

In certain situations, a touch panel may be substituted for a user input device such as a keyboard, trackball or mouse, and also may allow for simple manipulations. Moreover, the touch panel can provide users with various types of buttons according to the types of applications to be executed or stages of the executed application. Accordingly, a touch panel, and more specifically, a touch screen, has been used as an input device for electronic equipment, such as a mobile phone, a personal digital assistant (PDA), a portable multimedia player (PMP), a digital camera, a portable games, a Moving Picture Experts Group Layer-3 (MP3) player, etc., as well as an automated teller machine (ATM), an information trader, a ticket vending machine, etc.

A touch panel can be classified into a resistive type, a capacitive type, a saw type, an infrared type, etc., according to methods of sensing user's inputs. With recent active studies into a user interface using multi-touch, a capacitive type touch panel allowing multi-touch recognition has attracted a large amount of attention. The capacitive type touch panel detects the occurrence of contact by sensing the amount of charge passing through a finger, etc. contacting the touch panel.

Since the capacitive type touch panel can sense even a slight contact, implementation of dragging is easy, but incorrect inputs may often occur. Further, the capacitive type touch panel fails to offer users a sense of input, that is, a feeling of recognition that a user gets upon inputting. In order to overcome this disadvantage, a method of installing a vibration motor below a touch panel has been proposed. The method offers users a sense of input by vibrating the whole touch panel using the vibration motor when contact is sensed.

SUMMARY

One or more embodiments relate to a touch panel that can offer a sense of input similar to that felt when pressing a mechanical key pad or key button, and an electronic device including the touch panel.

One or more exemplary embodiments also relate to a touch panel that can offer a clicking sensation and multi-touch recognition, and an electronic device including the touch panel.

According to an aspect of an embodiment, there is provided a touch panel including a touch panel body comprising a first substrate and a second substrate that is spaced apart from the first substrate, a plurality of driving electrodes that are arranged on the first substrate and the second substrate, and electro-rheological fluid that fills a gap between the first substrate and the second substrate; a driving unit that applies a driving voltage to all or a portion of the plurality of driving electrodes; and a sensing unit that applies a sensing signal sequentially to the plurality of driving electrodes and senses a variation in capacitance between the driving electrodes due to a variation of the gap between the first substrate and the second substrate in response to the sensing signal.

According to an aspect of another embodiment, there is provided a touch panel including a first substrate comprising M first electrode lines arranged in parallel and extending in a first direction, wherein M is an integer equal to or greater than 2; a second substrate spaced apart from the first substrate by a gap, the second substrate comprising N second electrode lines arranged in parallel and extending in a second direction orthogonal to the first direction, wherein N is an integer equal to or greater than 2; electro-rheological fluid filled in the gap between the first substrate and the second substrate; a pulse generating circuit unit that generates a driving pulse voltage for driving the electro-rheological fluid and a sensing pulse voltage for determining an occurrence of an input on the touch panel; a pulse applying circuit unit that combines the driving pulse voltage received from the pulse generating unit with the sensing pulse voltage and applies the combined voltage to the M first electrode lines; and a sensing circuit unit that senses a variation in capacitance at each of intersections of the M first electrode lines and the N second electrode lines, in response to the sensing pulse voltage.

According to an aspect of another embodiment, there is provided a method of controlling a touch panel, the touch panel comprising a first substrate comprising M first electrode lines arranged in parallel and extending in a first direction wherein M is an integer equal to or greater than 2, a second substrate spaced apart from the first substrate by a gap and comprising N second electrode lines arranged in parallel and extending in a second direction orthogonal to the first direction, wherein N is an integer equal to or greater than 2, and electro-rheological fluid filled in the gap between the first substrate and the second substrate. The method comprises sequentially applying a sensing signal to the M first electrode lines; and sensing, from the N second electrode lines, a variation in capacitance at intersections of the M first electrode lines and the N second electrode lines, in response to the sensing signal.

Other features and aspects will be apparent from the following detailed description, the drawings, and the claims.

BRIEF DESCRIPTION OF THE DRAWINGS

The above and/or other aspects will be more apparent from the following detailed description taken with reference to the accompanying drawings, in which.

DETAILED DESCRIPTION

Figure 1:
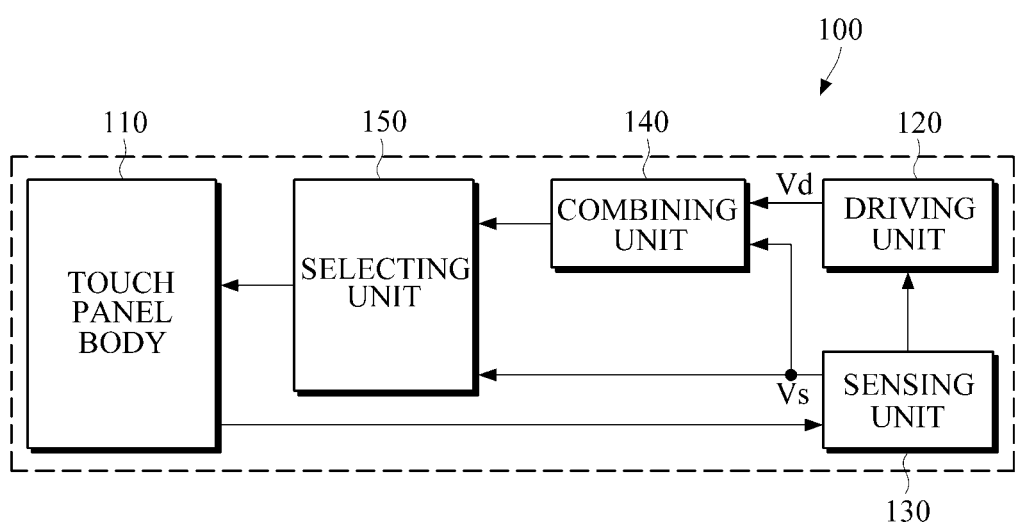
FIG. 1 is a diagram illustrating an example of a touch panel according to an embodiment.

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Throughout the drawings and the detailed description, unless otherwise described, the same drawing reference numerals will be understood to refer to the same elements, features, and structures. The relative size and depiction of these elements may be exaggerated for clarity, illustration, and convenience.

In this description of embodiments, a touch panel is one example of a kind of user input device and may be mounted onto various devices. For example, the touch panel may be utilized as an input device for various kinds of home/office appliances, as well as a touch pad for a notebook, a netbook or the like. Also, a touch panel may be implemented as a touch screen that is mounted onto a display of an electronic device. For example, the touch panel may be implemented as a touch screen of an electronic device, such as a mobile phone, a personal digital assistance (PDA), a portable media player (PMP), an electronic book (E-book) terminal, a portable computer, an automated teller machine (ATM), an information searcher, a ticket vending machine, etc.

FIG. 1 is a diagram illustrating an example of a touch panel 100 according to an embodiment. Referring to FIG. 1, the touch panel 100 includes a touch panel body 110, a driving unit 120 and a sensing unit 130. Also, the touch panel 100 may further include a combining unit 140 and a selecting unit 150. The touch panel body 110 is a physical structure included in the touch panel 100. The driving unit 120, the sensing unit 130, the combining unit 140 and the selecting unit 150 may be electrical circuits and/or a combination of hardware and software, or only software which control the operation of the touch panel body 110. Accordingly, the term "touch panel" used in this description may indicate the touch panel body 110 in a narrow sense, but may also indicate, in a broad sense, the entire touch panel 100 including all of the touch panel body 110, the driving unit 120, the sensing unit 130, the combining unit 140 and/or the selecting unit 150.

In FIG. 1, the driving unit 120, the sensing unit 130, the combining unit 140 and the sensing unit 150 are shown to be separate units for logical classification according to their functions. However they may be integrated into a single unit or implemented as separate devices. Also, the logical function classification between the driving unit 120, the sensing unit 130, the combining unit 140 and the selecting unit 150 is for convenience of description. In other words, a single integrated component or an additional functional unit (for example, a controller to control the operation of a touch panel) may perform all or some functions of the driving unit 120, the sensing unit 130, the combining unit 140 and the selecting unit 150. Further, some functions may be interchangeably performed by one of the driving unit 120, the sensing unit 130, the combining unit 140 and the selecting unit 150. Hereinafter, a configuration of the touch panel body 110 will be described in detail.

Figure 2:
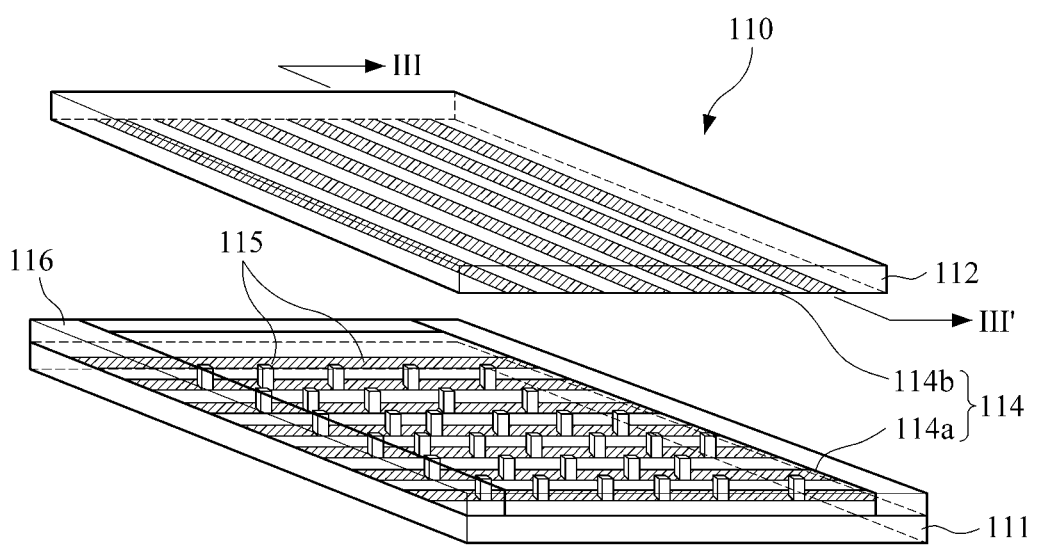
FIG. 2 is an exploded, perspective view showing a configuration of a touch panel body of the touch panel illustrated in FIG. 1.
Figure 3:
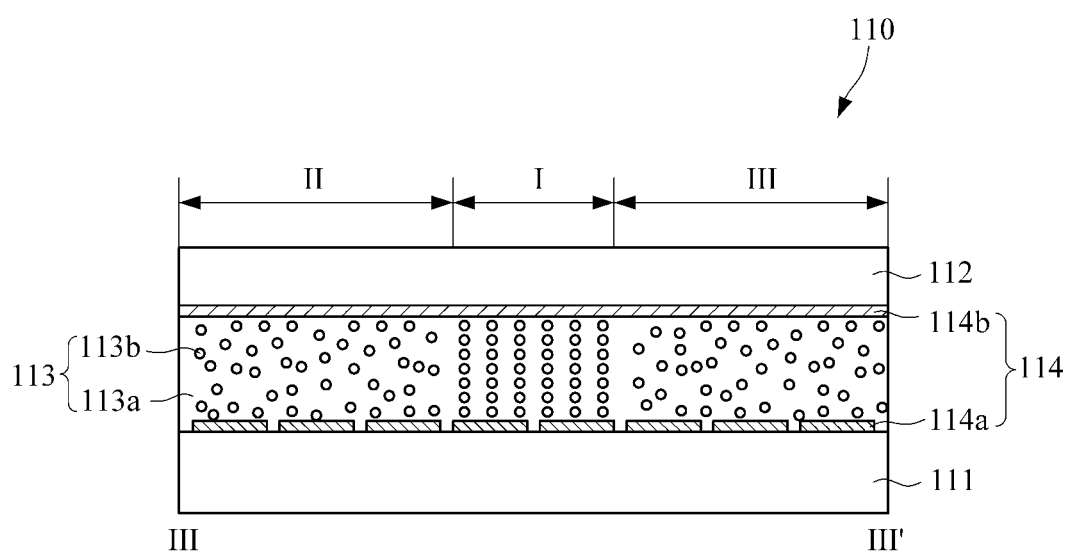
FIG. 3 is a cross-sectional view of the touch panel body cut along a III-III' line of FIG. 2.

FIG. 2 is an exploded, perspective view showing a configuration of the touch panel body 110 of the touch panel 100 illustrated in FIG. 1, and FIG. 3 is a cross-sectional view of the touch panel body 110 cut along a III-III' line of FIG. 2. Referring to FIGS. 2 and 3, the touch panel body 110 includes a lower substrate 111 and an upper substrate 11), electro-rheological fluid 113 that is filled and sealed in the gap between the lower substrate 111 and the upper substrate 112, and driving electrode arrays in which driving electrodes are arranged in pairs.

The lower substrate 111, which is a base substrate of the touch panel body 110, acts as one side of a container for filling the electro-rheological fluid 113 in the touch panel body 110. When the corresponding touch panel 100 (see FIG. 1) is implemented as a touch screen of an electronic device, the lower substrate 111 may be a display plane of the electronic device or a substrate attached additionally onto the display plane. The lower substrate 111 may be configured so as not to be deformed when certain attraction force or repulsive force is applied between the lower substrate 111 and the upper substrate 112. That is, the lower substrate 111 may be made of a rigid or hard material. For example, the lower substrate 111 may be made of transparent glass. However, there may be situations in which it is advantageous for the lower substrate 111 to be made of a material that is not a hard material. For example, if the touch panel body 110 is attached on a hard display, the lower substrate 111 may be made of a transparent polymer film.

The upper surface of the upper substrate 112 is a user touch surface S which a user contacts to input a signal. The upper substrate 112 may be deformed when predetermined force is applied thereto. For example, the upper substrate 112 may be deformed when a user contacts or presses the user touch surface S with a finger, a stylus pen, etc. For such deformation, the upper substrate 112 may be made of a transparent, deformable polymer film or the like. The type of polymer usable for the upper substrate 112 is not limited. The upper substrate 112 is spaced a predetermined distance apart from the lower substrate 111 and accordingly a gap having a predetermined thickness is formed between the upper and lower substrates 112 and 111. The thickness of the gap may be set appropriately in consideration of a driving voltage, the width of the touch panel body 110, a cross-sectional area of each driving electrode pair 114, etc.

The electro-rheological fluid 113 is disposed in the gap between the lower and upper substrates 111 and 112. The electro-rheological fluid 113 may be sealed with sealant 116 applied along facing edge portions of one or both of the lower substrate 111 and the upper substrate 112. The term electro-rheological fluid 113 indicates a suspension in which fine particles 113b are dispersed in electro-insulative fluid 113a. The viscosity of the electro-rheological fluid 113 can change by a factor of up to 100,000 when an electric field is applied thereto, and since such variation in viscosity is reversible, the viscosity returns to its original level when the electronic field is removed.

The electro-rheological fluid 113 may be a transparent liquid such as, for example, silicon oil, kerosene mineral oil, olefin (PCBs), or the like. However, the electro-rheological fluid 113 may be any other material that possesses similar properties of low viscosity change with changing temperature, high flash point, low freezing point, etc. and for which the viscosity changes as a function of the electric field applied thereto. The particles 113b included in the electro-rheological fluid 113 may be very fine, transparent particles having a size of maximally about 50 µm. The particles 113b may be polymers, such as aluminosilicate, polyaniline, polypyrrole, or fullerene, or any other kind of insulative materials, such as ceramics or the link. Non-transparent electro-rheological fluid may also be used in some applications.

Also, spacers 115 may be provided in a dispersed manner in the gap between the upper and lower substrates 112 and 111. The spacers 115 are elastic elements made of small, transparent particles whose size is less than about several tens of micrometers and are randomly distributed in the electro-rheological fluid 113. The spacers 115 shown in FIG. 2 are exaggerated in size, and the arrangement of the elastic spacers 115 shown as if they are dispersed at regular intervals is also exemplary for convenience of description, and in reality the spacers 115 are likely to be randomly dispersed. Materials used to form the spacers 115 are not limited, and for example, the spacers 115 may be made of elastomer. The spacers 115 are used to provide the upper substrate 112 with restoring force and support the upper substrate 112 structurally. That is, the spacers operate as elastic elements between the upper and lower substrate, and allow the substrates to recover to the original film shape in a very short time after a click operation, which will be described later. The spacers are advantageously spaced throughout the touch panel, but other types of distribution patterns may be used as long as the spacers may provide the restoring force and structural support. As discussed above, the distribution may also be random. For example, at the edges of the touch panel, the film tension is stronger than that of the center portion. Thus, it may be possible to user fewer spacers in the edge regions. That is, the spacer distribution may also vary depending on the location within the touch panel Each driving electrode pair 114 is a pair of an electrode formed on the lower substrate 111 and an electrode formed on the upper substrate 112. A plurality of driving electrode pairs 114 may be provided as driving electrode arrays in which driving electrodes are arranged in pairs in a matrix on the entire or partial area of the touch panel body 110. A driving voltage may be applied to a predetermined combination (for example, a predetermined portion of the driving electrode pairs 114) of the driving electrodes, and the predetermined combination may depend on the types of applications to be executed or stages of the executed application. Also, the touch panel 100 may offer a user a clicking sensation or various senses of input by controlling or varying the locations or number (for example, the location or range of an area to which the driving voltage is applied) of driving electrodes to which the driving voltage is applied among the driving voltages, a time at which the driving voltage is released, the number of driving electrodes from which the driving voltage is released, and so on.

The driving electrode pairs 114 illustrated in FIG. 2 are an example of electrode pairs arranged in a matrix. Referring to FIG. 2, a line-type lower electrode pattern 114a and a line-type upper electrode pattern 114b are formed on the upper surface of the lower substrate 111 and on the lower surface of the upper substrate 112, respectively. The lower electrode pattern 114a extends in a first direction, and the upper electrode pattern 114b extends in a second direction which is orthogonal to the first direction. Accordingly, the driving electrode pairs 114 are defined in a matrix at intersections of the lower electrode pattern 114a and the upper electrode pattern 114b over the entire area of the touch panel body 110.

Unlike the example illustrated in FIG. 2, it is also possible that lower and upper electrodes facing each other are formed in a dot form on the lower and upper substrates 111 and 112, respectively. Alternatively, the upper and lower electrodes facing each other may be arranged in a matrix on the entire or partial areas of the lower and upper substrates 111 and 112. Each of the lower and upper electrodes may have a polygon (for example, a square) section or a circular section. The driving electrodes formed in the dot form may individually connect to active devices allowing switching, and the dot-type driving electrodes may be individually switched or sensed by using the active devices to respond to a driving signal (or a control signal). That is, FIG. 2 shows line-type electrode patterns. However, it is also possible to provide an N×N array of electrodes on both the top and bottom, such that each individual pair of electrodes (top and bottom) is separately addressable and controllable.

Referring again to FIGS. 1 and 2, a driving signal (that is, a driving voltage) applied to the driving electrodes provides driving force to locally vary viscosity of the electro-rheological fluid 113. The driving voltage may be supplied from a power supply of an electronic device in which the touch panel 100 is installed. The locations and number of driving electrodes to which the driving voltage is applied, a time at which the applied driving voltage is released, the locations and number of driving electrodes from which the applied driving voltage released, etc. are variable and may be arbitrarily controlled by a controller or a user.

FIG. 3 shows the case where a driving voltage is applied to driving electrodes positioned in an area I while no driving voltage is applied to driving electrodes positioned in areas II and III. In this case, it is possible to make lower electrodes 114a positioned in the area I be in a ground state and lower electrodes positioned in the areas II and III to be in a floating state, while a predetermined voltage Vd is applied to the upper electrode pattern 114b. However, alternatively, it is also possible to apply the voltage Vd to the areas II and III while maintaining the area I in a floating state.

As seen in FIG. 3, when the driving voltage Vd is applied to driving electrode pairs 114 in the area I, an electrical field is locally induced in the gap between the lower and upper substrates 111 and 112. Due to the electrical field, the viscosity of electro-rheological fluid 113 in the area I increases. This is because particles 133b having polarization behavior are aligned along the orientation of the electrical field, which is illustrated in area I of FIG. 3. Since no driving voltage is applied to driving electrode pairs 114 in areas II and III, no electrical field is formed in the gap between the lower and upper substrates 111 and 112 corresponding to the locations of the driving electrodes 114 in areas II and III, and accordingly the viscosity of electro-rheological fluid 113 in the areas II and III is maintained in its current state, as shown in areas II and III of FIG. 3. Then, when the driving voltage Vd applied to the area I is no longer applied, the viscosity of the electro-rheological fluid 113 in the area I returns to its original state.

An example of such a touch panel using variations in viscosity of electro-rheo logical fluid has been disclosed in detail in Korean Patent Application No. 10-2009-0055034, filed on Jun. 19, 2009, by the present applicant, entitled "Touch Panel and Electronic Device Including the Same". Korean Patent Application No. 10-2009-0055034 corresponds to U.S. application Ser. No. 12/780,996, the entire disclosure of which is incorporated by reference herein in its entirety for all purposes. Korean Patent Application No. 10-2009-0055034 describes a touch panel which provides a clicking sensation similar to that felt when pressing a mechanical keypad.

The clicking sensation is a sense of "clicking" which is felt by a finger when pressing a mechanical keypad or a key button of a mobile phone or the like. In a mechanical keypad, a metal thin plate having a dome shape, which is called a metal dome or a popple, is installed below a key button. When the metal dome is pressed, the user may first sense repulsive force due to deformation. If the deformation exceeds a predetermined criteria, there is a buckling point causing sharp deformation. Due to such a buckling point, the user feels a clicking sensation when pressing a mechanical keypad.

Figure 4:
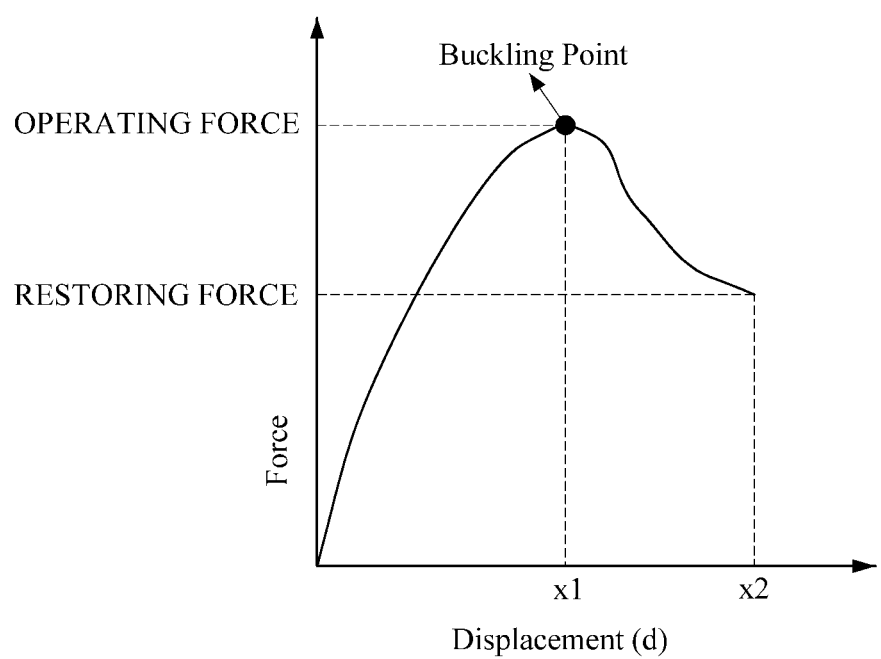
FIG. 4 is a graph showing a relationship of force to displacement in a mechanical key pad with a metal dome.

FIG. 4 is a graph showing a relationship of force to displacement when a mechanical keypad with a metal dome structure is utilized. Referring to FIG. 4, at the initial stage, the displacement of the metal dome increases as a pressing force increases. Along with the increase of the pressing force, the supporting force of the metal dome increases and accordingly a repulsive force also increases. Furthermore, the supporting force of the metal dome continues to increase until the pressing force reaches a predetermined criteria (operating force), and when the displacement of the metal dome reaches ×1, a buckling point occurs at which the supporting force of the metal dome sharply decreases. If the pressing force is maintained even after the bucking point, the displacement of the metal dome continues to increase, and when the displacement of the metal dome reaches ×2, the metal dome reaches the lower electrodes. Thereafter, if the pressing force disappears, the metal dome returns to its original state by restoring force.

Figure 5:
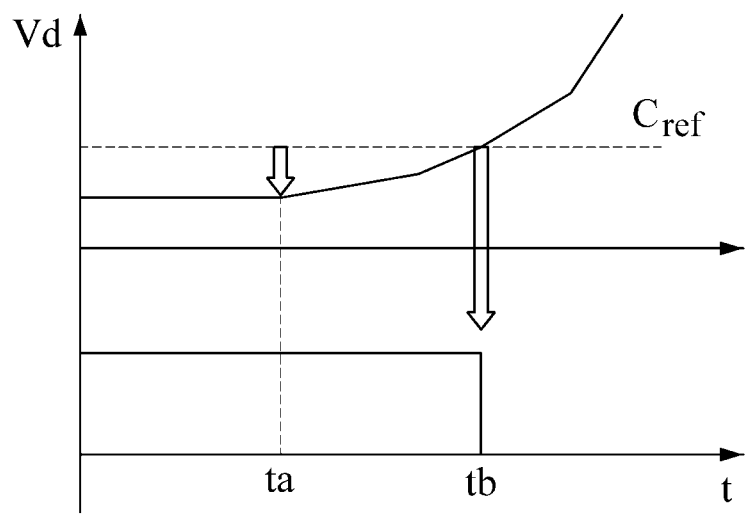
FIG. 5 is a graph showing timings at which a driving voltage Vd is applied to and released from driving electrodes.

The touch panel provides an experience of a clicking sensation by imitating a mechanism of a mechanical keypad. FIG. 5 is a graph showing timings at which a driving voltage Vd is applied to and released from driving electrodes.

As described above, when a driving voltage is applied to driving electrodes, electro-rheological fluid belonging to an area to which the driving voltage is applied is driven and its viscosity increases. The area (hereinafter, referred to as a driven area) in which the viscosity of electro-rheological fluid increases may provide a greater repulsive force against a pressing force than other areas (hereinafter, referred to as non-driven areas) in which the viscosity of electro-rheological fluid is not varied. Through variations in viscosity of electro-rheological fluid, when pressing a driven area of the touch panel, a repulsive force similar to that felt when pressing a mechanical keypad may be provided.

Also, when the driven area is pressed at a predetermined time (time $t_a$ of FIG. 5), the upper substrate is recessed to reduce the gap between upper and lower driving electrodes in the driven area and as a result, capacitance of the driving electrodes increases. If the driven area continues to be pressed, displacement of the upper substrate increases, and a repulsive force of the touch panel increases accordingly while the capacitance of the driving electrodes continues to increase. Thereafter, if the displacement of the upper substrate reaches a predetermined magnitude and thus the capacitance of the corresponding driving electrodes reaches a predetermined criteria $C_{ref}$ (a method of sensing $C_{ref}$ will be described later), the touch panel detects an input at this time (time $t_b$ of FIG. 5). Simultaneously, the driving voltage applied to the driving electrodes is released. When the driving voltage is released, the viscosity of the electro-rheological fluid is sharply reduced and the repulsive force against the pressing force sharply decreases accordingly. As a result, a clicking sensation may be felt similar to that felt at a buckling point when the driving voltage is released.

Referring again to FIGS. 1, 2 and 3, the driving unit 120 applies the driving voltage Vd to driving electrodes 114. The driving voltage Vd may be applied to all or some of the driving electrodes 114. The driving voltage Vd may be applied only during a predetermined time period or during a relatively long time period (for example, while the touch panel 100 operates). In both the former and latter cases, the driving voltage Vd may be considered as a driving pulse voltage that is maintained during a predetermined time period $t_d$. The predetermined time period $t_d$ for which the driving pulse voltage is maintained may be fixed or variable and also may be set to an arbitrary value by a controller or by a user.

Applying a driving voltage Vd to a driving electrode pair 114 denotes inducing an electrical field locally in the gap between the lower and upper substrates 111 and 112 by making a predetermined voltage difference between the driving electrode pair 114 formed on the lower and upper substrates 111 and 112. When the electrical field is locally induced, the viscosity of electro-rheological fluid also increases locally. Accordingly, when a driving voltage Vd is applied only to some driving electrodes 114, an electrical field is formed, so that only an area in which viscosity of electro-rheological fluid 113 increases becomes a driven area, and in the remaining area (a non-driven area), viscosity of electro-rheological fluid 113 does not vary.

In the case of using line-type electrodes, i.e., where the driving electrodes 114 include a pair of lower and upper electrode lines 114a and 114b intersecting each other, as illustrated in FIG. 2, the driving unit 120 may apply a predetermined magnitude of voltage Vd only to the upper electrode line 114b connected to at least one driving cell (a unit area forming a driven area defined by a driving electrode) among all upper electrode lines. Also, the driving unit 120 may make a lower electrode line connected to at least one driving cell among all lower electrode lines connect to a ground and a lower electrode line not connected to any driving cell be in a floating state. It will be apparent to one of ordinary skill in the art that the driving voltage Vd applied to the lower and upper electrode lines 114a and 114b by the driving unit 120 is variable, and the value may be set to a value determined experimentally.

The sensing unit 130 may detect an input to the touch panel body 110 and may recognize, when detecting the input, the location of the input. For example, as described above with reference to FIG. 5, the sensing unit 130 senses a variation in capacitance due to a variation of the gap between the driving electrodes 114, thereby detecting an occurrence of an input and recognizing the location of the input. Specifically, the sensing unit 130 may determine, when an increase of capacitance at the corresponding location is equal to or greater than a predetermined threshold, that an input has occurred. The threshold may be set experimentally. The sensing unit 130 may recognize the input location using location information of the driving electrodes with the increased capacitance.

For this, the sensing unit 130 may sequentially apply a sensing signal to the plurality of driving electrodes 114. Here, sequentially applying a sensing signal to the driving electrodes 114 may denote applying a sensing signal individually and sequentially to the driving electrodes 114, or applying a sensing signal sequentially to groups of driving electrodes (for example, a group of driving electrodes connected to a lower electrode line 114a or an upper electrode line 114b). By applying a sensing signal sequentially to the plurality of driving electrodes 114 and sensing occurrence of an input in response to the sensing signal, the sensing unit 130 may sense the location of the input as well as an occurrence of the input.

The sensing signal may be a sensing pulse voltage Vs having a predetermined duration. The predetermined duration is a short duration $t_s$ relative to the application duration of the driving voltage Vd and at least one sensing operation may be performed during the predetermined duration while the driving voltage is applied. In this case, the sensing unit 130 may sense an increase in capacitance between the driving electrodes 114 in response to the applied sensing signal Vs, thereby detecting occurrence of an input. This will be described later in more detail.

The sensing signal may be applied only to driving electrodes to which the driving voltage Vd has been applied or sequentially to all driving electrodes. In the latter case, sensing is performed on all driving electrodes including driving electrodes to which the driving voltage Vd is applied and driving electrodes to which no driving voltage Vd is applied. As such, by applying a sensing signal to driving electrodes to which no driving voltage is applied as well as driving electrodes to which a driving voltage is applied, an input may be sensed from a non-driven area as well as from a driven area of electro-rheological fluid so as for the touch panel 100 to achieve multi-touch recognition.

Information regarding occurrence of an input and/or information regarding the location of the input, which is sensed by the sensing unit 30, may be transferred to the driving unit 120. Then, the driving unit 120 may release the driving voltage Vd applied to all or some of the driving electrodes. As such, by releasing the applied driving voltage Vd according to an input signal, a clicking sensation may be provided using the touch panel 100.

The combining unit 140 may combine the driving voltage Vd applied from the driving unit 120 with a sensing signal received from the sensing unit 130, for example, a sensing pulse voltage Vs. Generally, the driving voltage Vd for driving the electro-rheological fluid 113 may be on the order of about tens or hundreds of volts, for example, about 100V. The driving voltage Vd may depend on the driving characteristics of the electro-rheological fluid 113 or the gap size between the upper and lower substrates 112 and 111, etc. The sensing voltage Vs for sensing variations in capacitance between the driving electrodes 114 may be on the order of about several volts (for example, 5V). The sensing voltage Vs may depend on the electrical characteristics of a circuit forming the sensing unit 130. Also, a circuit may be configured to allow sensing using a low voltage relative to the driving voltage Vd. In this case, the combining unit 140 may subtract the sensing pulse voltage Vs from the driving voltage Vd and apply the subtracted voltage to the driving electrodes. This will be described later in more detail. The subtracted voltage has little influence on driving of electro-rheological fluid 113 while functioning as a sensing signal.

The selecting unit 150 may selectively apply a voltage of the combined voltage output from the combining unit 140 and the sensing voltage Vs applied from the sensing unit 130 to the driving electrodes 114. For example, the selecting unit 150 may apply a combined voltage (that is, a voltage signal functioning as a sensing signal as well as allowing driving of the electro-rheological fluid 113) to driving electrodes positioned in a driven area or to an electrode line connected to at least one driving cell. Also, the selecting unit 150 may apply a sensing voltage Vs applied from the sensing unit 130 to driving electrodes positioned in other areas excluding viscosity-increased areas or electrode lines not connected to any driving cell.

Figure 6:
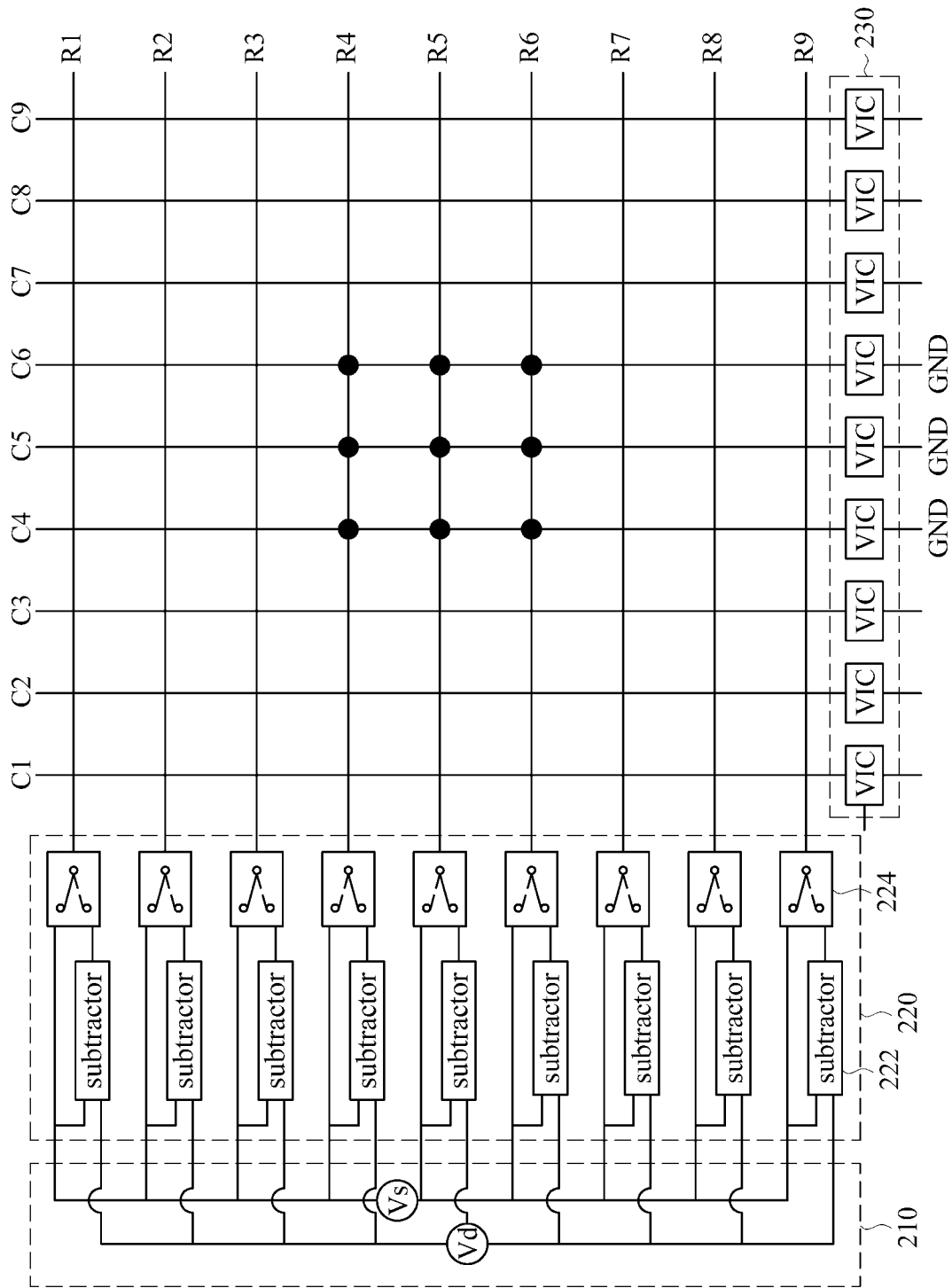
FIG. 6 illustrates an example of circuitry for driving the touch panel and sensing an input on the touch panel according to an embodiment.

FIG. 6 illustrates an example of circuitry for driving the touch panel and sensing an input on the touch panel according to an embodiment. The circuitry illustrated in FIG. 6 relates to a portion of the driving electrodes 114 of the touch panel body 110 illustrated in FIG. 2, for example, nine lower electrode lines 114a and nine upper electrode lines 114b. In this case, the lower and upper electrode lines 114a and 114b of the touch panel body 110 illustrated in FIG. 2 respectively correspond to electrode lines R1 through R9 in a row direction and electrode lines C1 though C9 in a column direction as illustrated in FIG. 6 or vice versa. Also, FIG. 6 shows the case where only driving electrodes (intersections of driving electrodes lines R4 though R6 and C4 through C6), illustrated as nine dots, at which driving electrode lines R1 through R9 in a row direction intersect driving electrodes lines C1 through C9 in a column direction are defined as driving cells so that the area including the nine dots is a driven area. However, the case illustrated in FIG. 6 is merely exemplary.

Referring to FIG. 6, a driving and sensing circuit of the touch panel includes a pulse generating circuit unit 210, a pulse applying circuit unit 220 and a sensing circuit unit 230. Although not illustrated in the drawing, the touch panel may further include a controller for controlling the operation of the driving and sensing circuit. The driving and sensing circuit of FIG. 6 is different in a detailed configuration from the touch panel 100 illustrated in FIG. 1. However, the difference is produced in terms of arrangement only and the driving and sensing circuit of FIG. 6 may have substantially the same configuration as the touch panel 100 of FIG. 1. For example, the pulse generating circuit unit 210 of FIG. 6 may correspond to the driving unit 120 for applying the driving voltage Vd and the sensing unit 130 for applying the sensing voltage Vs as illustrated in FIG. 1. Also, the pulse application circuit unit 220 of FIG. 6 may correspond to the combining unit 140 and the selecting unit 150 of FIG. 1, and the sensing circuit unit 230 of FIG. 6 may correspond to the sensing unit 130 for sensing capacitance variations. While the pulse generating circuit unit 210 and the pulse applying circuit unit 220 are shown in FIG. 6 as being connected to the rows R1 to R9, and the sensing circuit unit 230 is shown as being connected to the columns C1 to C9, this is only an example, and may be reversed such that the sensing circuit unit 230 is provided on the rows and the pulse generating circuit unit 210 and the pulse applying circuit unit 220 are provided on the columns.

The pulse generating circuit unit 210 generates a driving pulse voltage Vd and a sensing pulse voltage Vs and transfers the driving pulse voltage and the sensing pulse voltage to the pulse applying circuit unit 220. The driving pulse voltage Vd is an example of a driving signal for driving electro-rheological fluid, and the sensing pulse voltage Vs is an example of a sensing signal for detecting an input. The driving pulse voltage Vd may be a high voltage (for example, about 100V) of tens or hundreds of volts to drive electro-rheological fluid, whereas the sensing voltage Vs may be a low voltage (for example, 5V) below several volts, for sensing by the sensing circuit unit 230. The driving pulse voltage Vd and the sensing pulse voltage Vs depend on the physical structure (for example, the gap size between substrates, the electrical characteristics of the electro-rheological fluid and/or the section of driving electrodes) of the touch panel body (see 110 of FIG. 2), or the kind of a sensing circuit used in the sensing circuit unit 230 or the electrical characteristics of the sensing circuit.

The driving pulse voltage Vd may be maintained for a relatively long time period $t_d$ (for example, for about 1 second). For example, the driving pulse voltage Vd may be maintained until an input is detected. The sensing pulse voltage Vs may be maintained for a very short time period $t_s$, for example, in units of about several hundredths or thousandths of a second, or in units of microseconds. If the time period $t_s$ for which the sensing pulse voltage Vs is maintained is short, a time interval at which sensing is performed on the entire surface of the touch panel may be shortened.

The pulse generating circuit unit 210 may generate a driving pulse voltage Vd for three electrode lines R4 through R6 in the row direction, connected to 9 driving cells, rather than for all electrode lines R1 through R9 in the row direction, and apply the driving pulse voltage Vd to the pulse applying circuit unit 220. In this case, the driving pulse voltage Vd may be simultaneously applied to the three electrode lines R4 through R6 in the row direction.

The pulse generating circuit unit 210 may apply the sensing pulse voltage Vs to the pulse applying circuit unit 220 in order to apply the sensing pulse voltage Vs to some or all of the electrode lines R1 through R9 in the row direction. In this case, the sensing pulse voltage Vs may be sequentially, not simultaneously, applied to the three electrode lines R4 through R6. When the sensing pulse voltage Vs is sequentially applied to the electrode lines R1 to R3 and R7 to R9 not connected to any driving cell, as well as to the electrode lines R4 to R6 in the row direction connected to driving cells, variations in capacitance may be sensed even from driving electrodes to which no driving pulse voltage Vd is applied. In this way, by sequentially applying a sensing signal to all the electrode lines R1 through R9 in the row direction, sensing is performed on a non-driven area of electro-rheological fluid as well as on a driven area of electro-rheological fluid, thereby achieving multi-touch recognition.

The pulse applying circuit unit 220 may combine the driving pulse voltage Vd received from the pulse generating circuit unit 210 with the sensing pulse voltage Vs and apply the combined voltage to the electrode lines R1 through R9 in the row direction. For this, the pulse applying circuit unit 220 may include a plurality of pulse integration circuits 222 to combine the driving pulse voltage Vd with the sensing pulse voltage Vs, for the respective electrode lines R1 through R9 in the row direction. Since the pulse integration circuits 222 correspond one to one to the respective electrode lines R1 through R9, the pulse applying circuit unit 220 may include the same number of pulse integration circuits as that of the electrode lines R1 through R9 in the row direction.

Figure 7:
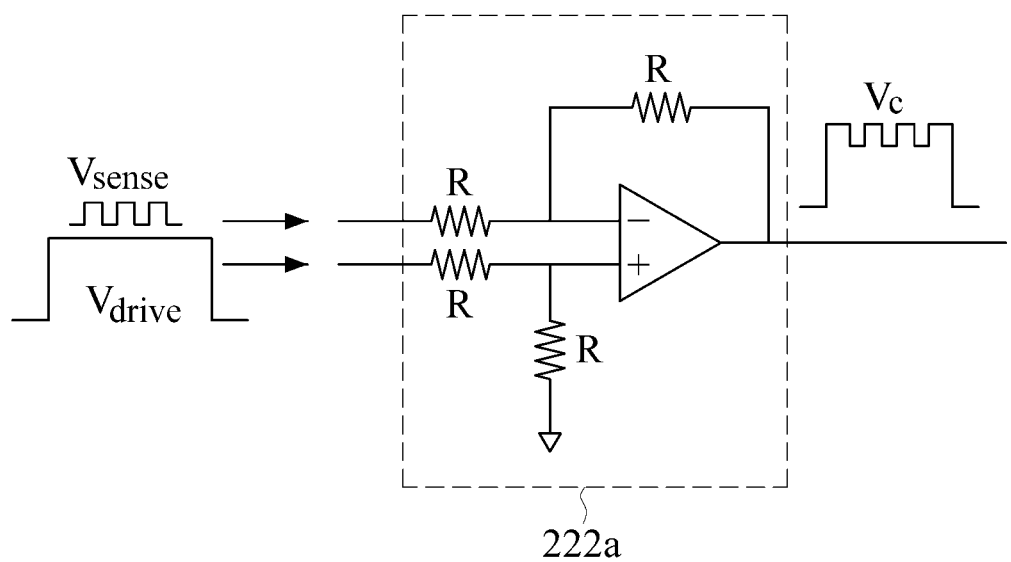
FIG. 7 illustrates an example of an operational amplifier subtracter that can be included in the circuitry illustrated in FIG. 6 according to an embodiment.

Each pulse integration circuit may be a subtractor. FIG. 7 illustrates an operational (OP) amplifier subtracter 222*a* that can be included in a pulse application circuit unit illustrated in FIG. 6. Referring to FIG. 7, if two types of input pulse voltages Vs and Vd having different amplitudes and different durations are input to the OP amplifier subtractor 222*a*, the OP amplifier subtractor 222*a* combines the two types of input pulse voltages Vs and Vd and outputs a combined pulse voltage Vc.

In the touch panel described above, the driving pulse voltage Vd is a high voltage of tens or hundreds of volts and the sensing voltage Vs is a low voltage below 5V. Also, the driving pulse voltage Vd and the sensing pulse voltage Vs are simultaneously applied to the same driving electrode. For example, both the driving pulse voltage Vd and the sensing pulse voltage Vs are applied through electrode lines in the row direction. In this case, if a subtractor is used as the pulse integration circuit, the driving pulse voltage is applied to one input terminal of the subtractor and the sensing pulse voltage is applied to the other input terminal of the subtractor, a subtracted pulse voltage (a combined pulse voltage) output from an output terminal of the subtractor is a high voltage capable of functioning as a sensing signal while driving electro-rheological fluid. This is because the sensing pulse voltage combined with the driving pulse voltage Vd does not influence on driving of electro-rheological fluid and functions only as a sensing signal for sensing the amount of variations in capacitance in driving electrodes since the sensing pulse voltage has a relatively small amplitude.

Referring to FIG. 6, the pulse applying circuit unit 220 may select one of the combined pulse voltage received from the pulse integration circuits 222 and the sensing pulse voltage received from the pulse generating circuit unit 210 (see FIG. 6), and apply the selected voltage to the respective electrode lines R1 through R9 in the row direction. For this, the pulse applying circuit unit 220 may include a plurality of switching devices 224 to select one of the two input pulse voltages. Since the switching devices 224 also correspond one to one to the electrode lines R1 through R9 in the row line, the pulse applying circuit unit 220 may include the same number of switching devices 224 as that of the electrode lines R1 through R9 in the row direction. Each switching device 224 may be a MUX to select one pulse voltage from the sensing pulse voltage Vs received from the pulse generating circuit unit 210 and the sensing pulse voltage Vs received from the pulse integration circuit 222, and apply the selected pulse voltage to a corresponding one of the electrode lines R1 through R9 in the row direction.

Figure 8:
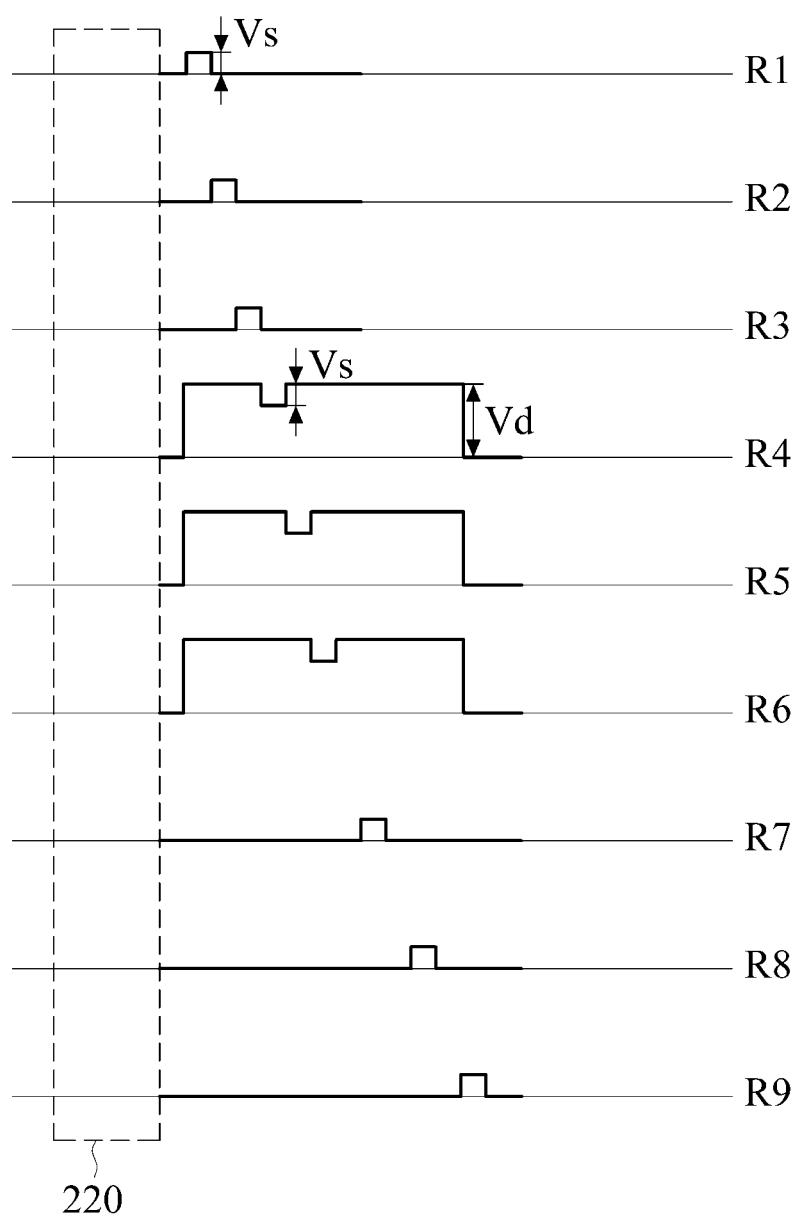
FIG. 8 is an example of a timing chart showing a driving pulse voltage and a sensing pulse voltage applied to individual electrode lines R1 through R9 which are arranged in a row direction.

FIG. 8 is an example of a timing chart showing a driving pulse voltage Vd and a sensing pulse voltage Vs applied to the individual electrode lines R1 through R9 in the mw direction, wherein three electrode lines R4, R5 and R6 are connected to driving cells. The amplitudes, durations, etc. of the driving pulse voltage Vd and sensing pulse voltage Vs, as shown in FIG. 8, are only for convenience of description and may vary in actual implementation. Referring to FIG. 8, the driving pulse voltage Vd (specifically, the driving pulse voltage Vd from which the sensing pulse voltage Vs is subtracted), which is a driving signal, is applied only to the three electrode lines R4 through R6 in the row direction connected to the driving cells. The sensing pulse voltage Vs, which is a sensing signal, is combined with the driving pulse voltage Vd and applied to all the electrode lines R1 through R9 in the row direction.

Referring again to FIG. 6, the sensing circuit unit 230 senses capacitance variations at intersections of the electrode lines R1 through R9 in the row direction and electrode lines C1 through C9 in the column direction, that is, in driving electrodes, in response to a sensing signal (for example, a sensing pulse voltage) sequentially input to the individual electrode lines R1 through R9 in the row direction. Since the sensing signal is sequentially input to the individual electrode lines R1 through R9 in the row direction, a capacitance variation at each driving electrode may be sensed by detecting a variation of an electrical signal output through each of the electrode lines C1 through C9 in the column direction. For this operation, the sensing circuit unit 230 may include a plurality of sensing devices which are connected one to one to the electrode lines C1 through C9 in the column direction and which can sense capacitance variations at driving electrodes.

Figure 9A:
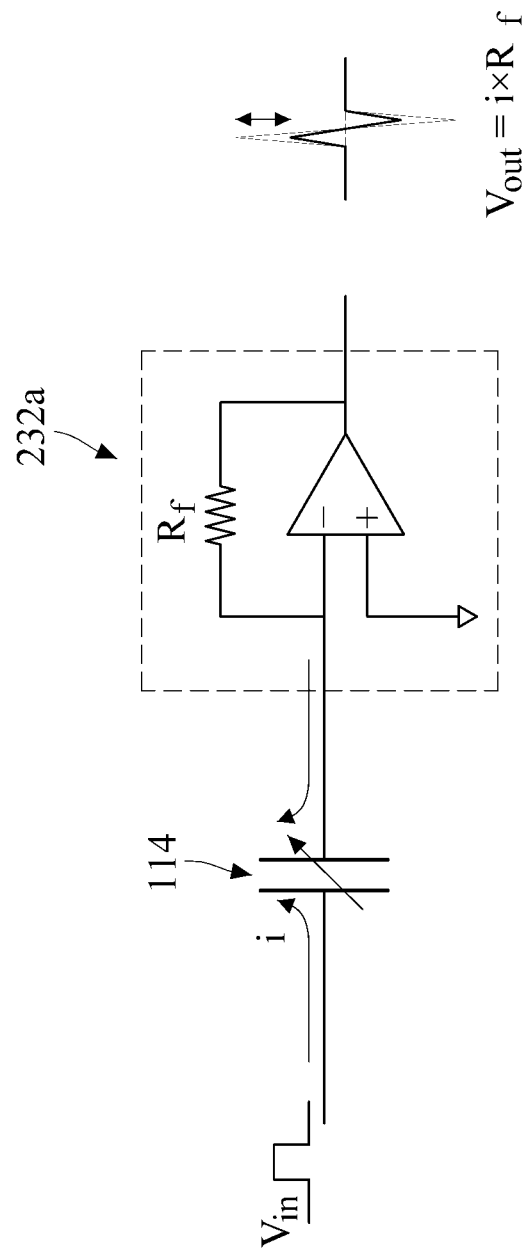
FIG. 9A is a view for explaining a process of sensing variations in capacitance at driving electrodes using a voltage-current converter according to an embodiment.

Each sensing device may be a voltage-to-current converter (VIC). FIG. 9A is a view for explaining a process of sensing variations in capacitance at driving electrodes 114 using a voltage-current converter 232a. Referring to FIG. 9A, when a capacitance value at the driving electrodes 114 changes due to a variation of the gap between the driving electrodes 114, the amount of charge (that is, a current i) charged to and discharged from both terminals of a capacitor (that is, the driving electrodes 114) due to reception of an input pulse voltage $V_{in}$ is varied accordingly. The variation in such a charging and discharging current i passes through the voltage-current converter (for example, 232a of FIG. 9A), thereby appearing as a variation of an output voltage $V_{out}$ which corresponds to a product of feedback resistance $R_f$ and the charging and discharging current i. Then, by determining whether the variation of the output voltage $V_{out}$ from the voltage-current converter 232a exceeds a predetermined threshold, an input is determined with respect to the corresponding driving electrodes 114. The threshold may be determined experimentally.

Figure 9B:
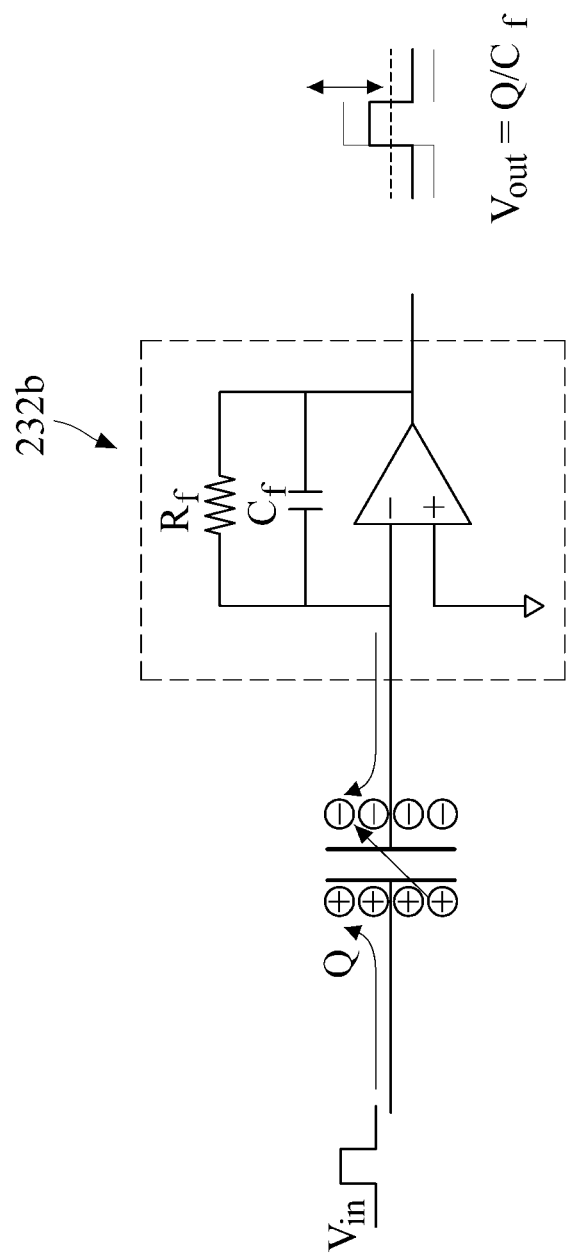
FIG. 9B is a view for explaining a process of sensing variations in capacitance at driving electrodes using a charge amplifier according to an embodiment.

As another example, each sensing device may be a charge amplifier. FIG. 9B is a view for explaining a process of sensing variations in capacitance at driving electrodes using a charge amplifier 232b. Referring to FIG. 9B, if a capacitance value changes due to a variation of the gap between electrodes, the amount Q of charge charged to or discharged from both terminals of a capacitor (that is, driving electrodes 114) varies due to reception of an input pulse voltage $V_{in}$. The variation of the charge Q charged and discharged passes through the charge amplifier 232b, thereby appearing as a variation of an output voltage $V_{out}$ which corresponds to a value resulting from dividing the amount of the charge Q by feedback capacitance $C_f$. Accordingly, by determining whether the variation of the output voltage $V_{out}$ exceeds a predetermined threshold value, an input is determined with respect to the corresponding driving electrodes 114.

Figure 10:
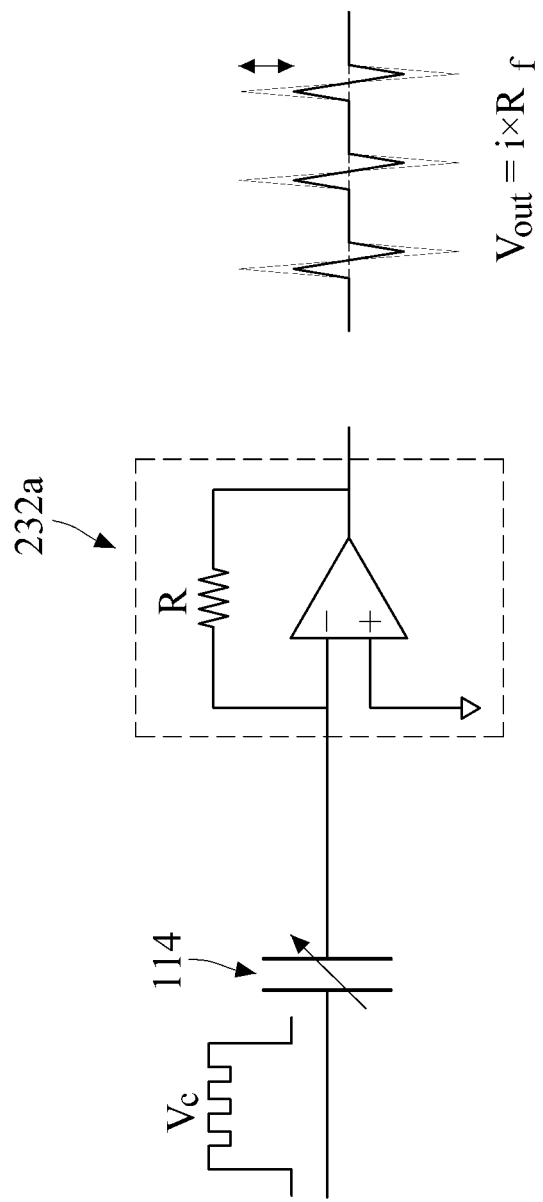
FIG. 10 shows an output voltage $V_{out}$ of the voltage-current converter illustrated in FIG. 9A when receiving a pulse voltage which is a combination of a driving pulse voltage and a sensing pulse voltage.

FIG. 10 shows an output voltage $V_{out}$ of the voltage-current converter 232a when receiving a pulse voltage which is a combination of a driving pulse voltage and a sensing pulse voltage. FIG. 10 illustrates a case in which a combined pulse voltage output from the subtractor 222a of FIG. 7 is input to the voltage-current converter 232a. It can be seen from FIG. 10 that a capacitance variation in driving electrodes 114 may be sensed using a combined pulse voltage by using a variation of an output voltage $V_{out}$ of the voltage-current converter 232a, the output voltage appearing as a product of a charging and discharging current i and feedback resistance $R_f$.

Referring again to FIG. 6, in the touch panel, some of the electrode lines C1 through C9 in the row direction are in a ground state and the remaining electrode lines are in a floating state. That is, a voltage of approximately 0V is applied to the electrode lines C4 through C6 in the column direction connected to at least one driving cell so as to apply a driving voltage to the corresponding driving electrodes. The remaining electrode lines C1 through C3 and C7 through C9 are not connected to any driving cell and enter an electrically floating state as to not apply the driving voltage to the corresponding driving electrodes. For the operation, each of the electrode lines C1 through C9 in the column direction has to be able to be selected to have one of the ground state and the floating state.

One method for selecting the states of the electrode lines C1 through C9 is to use a circuit including switchable OP amplifiers as sensing devices respectively connected to the electrode lines C1 through C9 in the column direction. For example, an OP amplifier included in the voltage-current converter 232a of FIG. 9A or an OP amplifier included in the charge amplifier 232b of FIG. 9B may be a switchable OP amplifier. Such a switchable OP amplifier is used to selectively apply one of the ground state and the floating state to each of electrode lines connected thereto.

Figure 11:
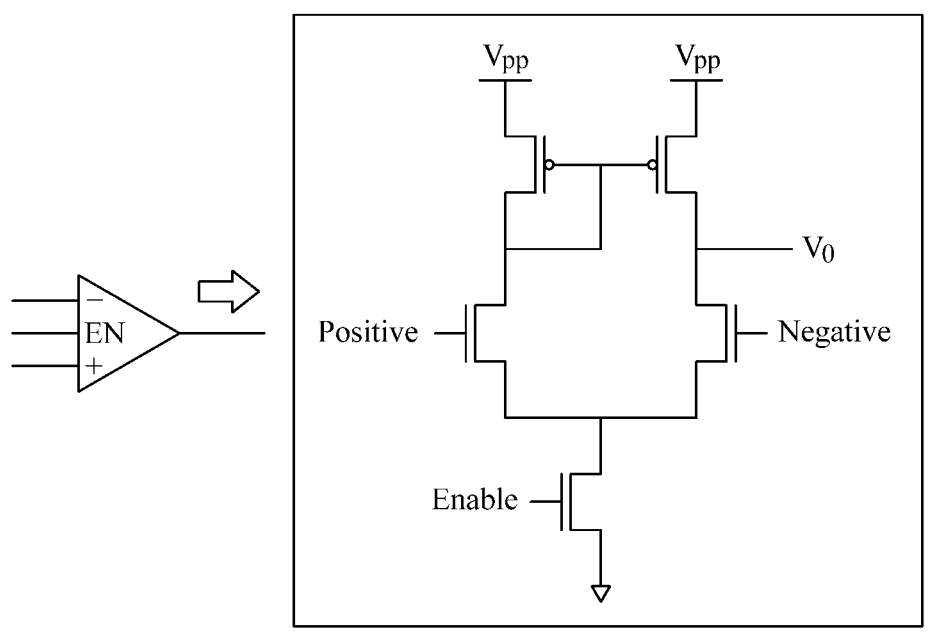
FIG. 11 is a circuit diagram of an example of a simple current mirrored amplifier according to an embodiment.

FIG. 11 is a circuit diagram of a simple current mirrored amplifier, which is another example of the switchable OP amplifier. Referring to FIG. 11, the switchable OP amplifier has an enable terminal EN. When a predetermined voltage is applied to the enable terminal EN of the OP amplifier, the OP amplifier operates so as to apply a voltage of approximately 0V to electrode lines in the column direction connected to the OP amplifier according to a virtual ground. When a voltage of approximately 0V is applied to the enable terminal EN of the OP amplifier, the OP amplifier does not operate to make the electrode lines in the column direction connected to the OP amplifier in the floating state.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A touch panel comprising:
a touch panel body comprising a first substrate and a second substrate that is spaced apart from the first substrate, a plurality of driving electrodes that are arranged on the first substrate and the second substrate, and electrorheological fluid that fills a gap between the first substrate and the second substrate;
a driving unit that applies a driving voltage to all or a portion of the plurality of driving electrodes; and
a sensing unit that applies a sensing signal sequentially to the plurality of driving electrodes and senses a variation in capacitance between the driving electrodes due to a variation of the gap between the first substrate and the second substrate in response to the sensing signal,
wherein the sensing signal is applied by the sensing unit so that at least one sensing operation for all of the plurality of driving electrodes is performed while the driving voltage is applied by the driving unit,
wherein the sensing signal is a sensing pulse voltage, and the plurality of driving electrodes are arranged on the first substrate and the second substrate to form driving electrode arrays, and
the touch panel further comprises a combining unit that combines the driving voltage with the sensing pulse voltage and applies the combined voltage to the driving electrode arrays, and
wherein the combined voltage is obtained by subtracting the sensing pulse voltage from the driving voltage.

2. The touch panel of claim 1, wherein if the variation in capacitance sensed by the sensing unit is equal to or greater than a threshold capacitance, the driving unit stops applying the applied driving voltage.

3. The touch panel of claim 1, further comprising a selecting unit that selects one voltage of the combined voltage and the sensing pulse voltage and applies the selected voltage to the plurality of driving electrodes.

4. The touch panel of claim 1, wherein the plurality of driving electrodes comprise a plurality of first electrode lines arranged on the first substrate and extending in parallel in a first direction, and a plurality of second electrode lines arranged on the second substrate and extending in parallel in a second direction orthogonal to the first direction, and the sensing signal is applied sequentially to the plurality of first electrode lines while the driving voltage is applied to all or a portion of the plurality of driving electrodes.

5. The touch panel of claim 4, wherein the sensing unit comprises a voltage-current converter or a charge amplifier connected to each of the plurality of second electrode lines.

6. An electronic device comprising a touch panel of claim 1 as a user input device.

7. A touch panel comprising:
a first substrate comprising M first electrode lines arranged in parallel and extending in a first direction, wherein M is an integer equal to or greater than 2;
a second substrate spaced apart from the first substrate by a gap, the second substrate comprising N second electrode lines arranged in parallel and extending in a second direction orthogonal to the first direction, wherein N is an integer equal to or greater than 2;
electro-rheological fluid filled in the gap between the first substrate and the second substrate;
a pulse generating circuit unit that generates a driving pulse voltage for driving the electro-rheological fluid and a sensing pulse voltage for determining an occurrence of an input on the touch panel;
a pulse applying circuit unit that combines the driving pulse voltage received from the pulse generating unit with the sensing pulse voltage and applies the combined voltage to the M first electrode lines; and
a sensing circuit unit that senses a variation in capacitance at each of intersections of the M first electrode lines and the N second electrode lines, in response to the sensing pulse voltage,
wherein the pulse applying circuit combines the sensing pulse voltage with the driving pulse voltage so that the sensing circuit unit performs at least one sensing operation for all of the intersections of the M first electrode lines and the N second electrode lines while the driving pulse voltage is applied, and
wherein the pulse applying circuit comprises M subtractors provided to correspond one to one with the M first electrode lines and connected respectively thereto, each subtractor subtracting the sensing pulse voltage from the driving pulse voltage and outputting the subtracted voltage to a first electrode line connected thereto.

8. The touch panel of claim 7, wherein the sensing pulse voltage is applied sequentially to the M first electrode lines.

9. The touch panel of claim 8, wherein the sensing pulse voltage is applied when the driving pulse voltage is applied to all or a portion of the M first electrode lines.

10. The touch panel of claim 7, wherein the pulse applying circuit unit comprises M switching devices provided to correspond one to one with the M first electrode lines and connected respectively thereto, each switching device selectively applying one voltage of a subtracted pulse voltage output from a corresponding subtractor and the sensing pulse voltage received from the pulse generating unit to a first electrode line connected thereto.

11. The touch panel of claim 7, wherein the sensing circuit unit comprises N voltage-to-current converters or N charge amplifiers connected one to one to the N second electrode lines.

12. The touch panel of claim 11, wherein each voltage-current converter or each charge amplifier is a switchable OP amplifier.

13. The touch panel of claim 7, wherein the sensing circuit unit selectively sets each of the N second electrode lines to one state of a ground state and a floating state.

14. The touch panel of claim 7, wherein a width of the sensing pulse voltage is equal to or smaller than a width of the driving pulse voltage multiplied by (1/M).

15. The touch panel of claim 7, wherein if the sensing circuit unit determines that a variation in capacitance sensed from at least one electrode line among the N electrode lines is equal to or greater than a threshold capacitance, the pulse applying unit releases the applied driving voltage from all or a portion of the N electrode lines.

16. A method of controlling a touch panel, the touch panel comprising a first substrate comprising M first electrode lines arranged in parallel and extending in a first direction wherein M is an integer equal to or greater than 2, a second substrate spaced apart from the first substrate by a gap and comprising N second electrode lines arranged in parallel and extending in a second direction orthogonal to the first direction, wherein N is an integer equal to or greater than 2, and electro-rheological fluid filled in the gap between the first substrate and the second substrate, the method comprising:
applying a driving voltage to all or a portion of the M first electrode lines;
sequentially applying a sensing signal to the M first electrode lines; and
sensing, from the N second electrode lines, a variation in capacitance at intersections of the M first electrode lines and the N second electrode lines, in response to the sensing signal,
wherein the sensing signal is applied so that at least one sensing operation for all of the intersections of the M first electrode lines and the N second electrode lines is performed while the driving voltage is applied,
wherein the sensing signal is a sensing pulse voltage, and
wherein the combined voltage, which is obtained by subtracting the sensing pulse voltage from the driving voltage, is applied for performing the at least one sensing operation.

17. The method of claim 16, further comprising:
applying a driving voltage to all or a portion of the M first electrode lines,
wherein the sensing signal is applied when the driving voltage is applied.

18. The method of claim 17, wherein the sensing of the variation in capacitance further comprises:
releasing the applied driving voltage from all or a portion of the M first electrode lines when the variation in the capacitance is equal to or greater than a threshold capacitance.

19. A touch panel comprising:
an M×N array of first driving electrodes arranged on a first substrate and an M×N array of second driving electrodes arranged on a second substrate so as to form an M×N array of driving electrode pairs, the first substrate and the second substrate being spaced apart by a gap;
electro-rheological fluid filled in the gap;
a pulse generating circuit unit that generates a driving pulse voltage and a sensing pulse voltage;

a pulse applying circuit unit that combines the driving pulse voltage received from the pulse generating unit with the sensing pulse voltage and applies the combined voltage individually to each of the driving electrode pairs of the M×N array of driving electrode pairs; and a sensing circuit unit that senses a variation in capacitance at each driving electrode pair of the M×N array of driving electrode pairs in response to the combined voltage individually applied thereto, wherein the sensing pulse voltage is combined with the driving pulse voltage so that the sensing circuit unit performs at least one sensing operation for all of the driving electrode pairs of the M×N array of driving electrode pairs while the driving pulse voltage is applied, and wherein the pulse applying circuit comprises M×N subtractors provided to correspond one to one with the M×N array of driving electrode pairs and connected respectively thereto, each subtractor subtracting the sensing pulse voltage from the driving pulse voltage and outputting the subtracted voltage to a driving electrode pair connected thereto.

20. The touch panel according to claim 19, wherein M is at least 2 and N is at least 2.

* * * * *